(12) United States Patent
Salter et al.

(10) Patent No.: US 10,542,606 B2
(45) Date of Patent: Jan. 21, 2020

(54) ILLUMINATED BADGE SYSTEM FOR A MOTOR VEHICLE

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); Michael A. Musleh, Canton, MI (US); Mehran Niksimaee, Orchard Lake Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/382,949

(22) Filed: Apr. 12, 2019

(65) Prior Publication Data

US 2019/0239317 A1    Aug. 1, 2019

Related U.S. Application Data

(63) Continuation of application No. 14/873,758, filed on Oct. 2, 2015, now Pat. No. 10,299,345.

(51) Int. Cl.
*H05B 37/02* (2006.01)
*H05B 33/08* (2006.01)
(Continued)

(52) U.S. Cl.
CPC ....... *H05B 37/0227* (2013.01); *B60Q 1/0088* (2013.01); *B60Q 1/26* (2013.01);
(Continued)

(58) Field of Classification Search
CPC ............ H05B 37/0227; H05B 37/0272; H05B 37/0218; H05B 33/0872; H05B 33/0854; H05B 37/02; B60Q 1/0088; B60Q 1/2619; B60Q 1/2603; B60Q 1/50; B60Q 1/54; B60Q 1/26; B60Q 1/56; Y02B 20/46;
(Continued)

(56) References Cited

U.S. PATENT DOCUMENTS

| | | | | |
|---|---|---|---|---|
| 5,874,894 A | * | 2/1999 | Heller | B60Q 1/302 340/467 |
| 5,939,979 A | * | 8/1999 | Lee | B60Q 1/26 340/468 |

(Continued)

FOREIGN PATENT DOCUMENTS

| | | | |
|---|---|---|---|
| DE | 102011113913 A1 | * 3/2013 | ............... B60Q 1/28 |
| DE | 102011113913 A1 | 3/2013 | |
| JP | 2005074998 A | 3/2005 | |

OTHER PUBLICATIONS

English Machine Translation of DE102011113913A1 dated Mar. 21, 2013.

(Continued)

*Primary Examiner* — Renan Luque
(74) *Attorney, Agent, or Firm* — Vichit Chea; Price Heneveld LLP

(57) ABSTRACT

An illuminated badge system is provided for a motor vehicle. The illuminated badge system includes an illuminated badge and a controller. The controller is configured to adjust a parameter of the light emitted from the illuminated badge in response to a designated operating parameter such as the headlight status of the motor vehicle.

20 Claims, 3 Drawing Sheets

(51) Int. Cl.
 *B60Q 1/26* (2006.01)
 *B60Q 1/50* (2006.01)
 *B60Q 1/54* (2006.01)
 *B60Q 1/00* (2006.01)

(52) U.S. Cl.
 CPC ........ *B60Q 1/2603* (2013.01); *B60Q 1/2619* (2013.01); *B60Q 1/50* (2013.01); *B60Q 1/54* (2013.01); *H05B 33/0872* (2013.01); *H05B 37/0218* (2013.01); *H05B 37/0272* (2013.01); *Y02B 20/46* (2013.01)

(58) Field of Classification Search
 CPC ....... G09F 2007/1882; G09F 2013/044; G09F 21/04; G09F 13/005; B60R 13/00; B60R 13/005
 See application file for complete search history.

(56) References Cited

U.S. PATENT DOCUMENTS

| | | | |
|---|---|---|---|
| 6,717,376 B2 | 4/2004 | Lys et al. | |
| 7,812,716 B1 | 10/2010 | Cotter | |
| 8,752,989 B2 | 6/2014 | Roberts et al. | |
| 9,007,193 B2 | 4/2015 | Boston et al. | |
| 2003/0123705 A1* | 7/2003 | Stam | B60Q 1/085 382/104 |
| 2003/0142510 A1 | 7/2003 | Yongzhong | |
| 2004/0143437 A1 | 7/2004 | Hanood | |
| 2006/0291233 A1* | 12/2006 | Kwon | B60Q 1/50 362/540 |
| 2008/0055040 A1 | 3/2008 | Lizza et al. | |
| 2009/0262189 A1 | 10/2009 | Marman | |
| 2012/0212336 A1* | 8/2012 | Smith | B60Q 1/50 340/466 |
| 2012/0280528 A1 | 11/2012 | Dellock et al. | |
| 2013/0311039 A1 | 11/2013 | Washeleski | |
| 2013/0335997 A1* | 12/2013 | Roberts | G09F 21/04 362/583 |
| 2015/0239390 A1* | 8/2015 | Oliverio | G07C 5/08 340/461 |
| 2015/0241015 A1* | 8/2015 | Johnson | G09F 19/18 362/509 |
| 2015/0241016 A1* | 8/2015 | Sura | B60Q 1/56 362/509 |
| 2016/0167479 A1* | 6/2016 | Morin | B60Q 1/50 701/48 |
| 2016/0201874 A1* | 7/2016 | Stemmer | F21V 3/049 362/555 |
| 2017/0021760 A1 | 1/2017 | Calnek | |
| 2017/0329210 A1 | 11/2017 | Zawacki | |

OTHER PUBLICATIONS

English Machine Translation of JP2005074998A dated Mar. 24, 2005.

* cited by examiner

ILLUMINATED BADGE SYSTEM FOR A MOTOR VEHICLE

This application is a continuation of U.S. patent application Ser. No. 14/873,758, filed Oct. 2, 2015, the full disclosure of which is incorporated herein by reference.

TECHNICAL FIELD

This document relates generally to to the motor vehicle equipment field and, more particularly, to an illuminated badge system for a motor vehicle that incorporates a number of unique functions and operating features.

BACKGROUND

It is known in the art for automobile manufacturers to adorn motor vehicles with a badge or logo to clearly identify the make and/or model of the motor vehicle. This document relates to a new and improved illuminated badge system incorporating a number of unique operating features adapted to clearly distinguish the motor vehicle from other makes and enhance the satisfaction of the vehicle operator.

SUMMARY

In accordance with the purposes and benefits described herein, an illuminated badge system is provided for a motor vehicle. That illuminated badge system comprises an illuminated badge and a controller which is configured to adjust a parameter of light emitted from the illuminated badge in response to headlight status of the motor vehicle.

In one possible embodiment, the controller is further configured to adjust a parameter of light emitted from the illuminated badge in response to a transmission state of the motor vehicle. In yet another possible embodiment, the controller is further configured to adjust a parameter of light emitted from the illuminated badge in response to the detection of a signal from a key fob not matched to the motor vehicle. In any embodiment, the adjusted parameter may, for example, be the light intensity of the badge, the light color of the badge or both the light intensity and the light color of the badge.

In one possible embodiment, the illuminated badge has a first portion illuminated in a first color and a second portion illuminated in a second color. In such an embodiment, the controller may be configured to adjust a parameter of light emitted from either or both portions of the illuminated badge in response to any motor vehicle parameter of interest that is being monitored. Such parameters include, but are not necessarily limited to, motor vehicle speed, ambient light conditions and whether the motor vehicle is attended or unattended. Further, the controller may be configured to monitor a battery charge state of the motor vehicle and deactivate the illuminated badge when the battery charge status falls below a predetermined level.

In accordance with still another aspect, a method is provided of controlling a parameter of light emitted from an illuminated badge of a motor vehicle. That method may be broadly described as comprising the step of adjusting the parameter, by means of a controller, in response to headlight status of the motor vehicle. Further, that method may include adjusting the parameter, by means of a controller, in response to a transmission state of the motor vehicle. Further, that method may include adjusting the parameter, by means of a controller, in response to the detection of a signal from a key fob not matched to the motor vehicle.

In yet another embodiment, the method may include the step of adjusting the parameter by means of a controller in response to one or more of vehicle speed, current ambient light conditions and whether the motor vehicle is attended or unattended.

Still further, the method may include illuminating a first portion of the illuminated badge in a first color and a second portion of the illuminated badge in a second color. Further, the method may include adjusting, by means of a controller, the intensity of light emitted from the first portion of the illuminated badge and the second portion of the illuminated badge in response to the sensitivity of the human eye to the first color and the second color.

In the following description, there are shown and described several preferred embodiments of the illuminated badge system as well as the associated method of controlling a parameter of light emitted from an illuminated badge of a motor vehicle. As it should be realized, the system and associated method are capable of other, different embodiments and their several details are capable of modification in various, obvious aspects all without departing from the system and associated method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the illuminated badge system and together with the description serve to explain certain principles thereof. In the drawing figures.

Reference will now be made in detail to the present preferred embodiments of the illuminated badge system and associated method, examples of which are illustrated in the accompanying drawing figures.

DETAILED DESCRIPTION

Figure 1:
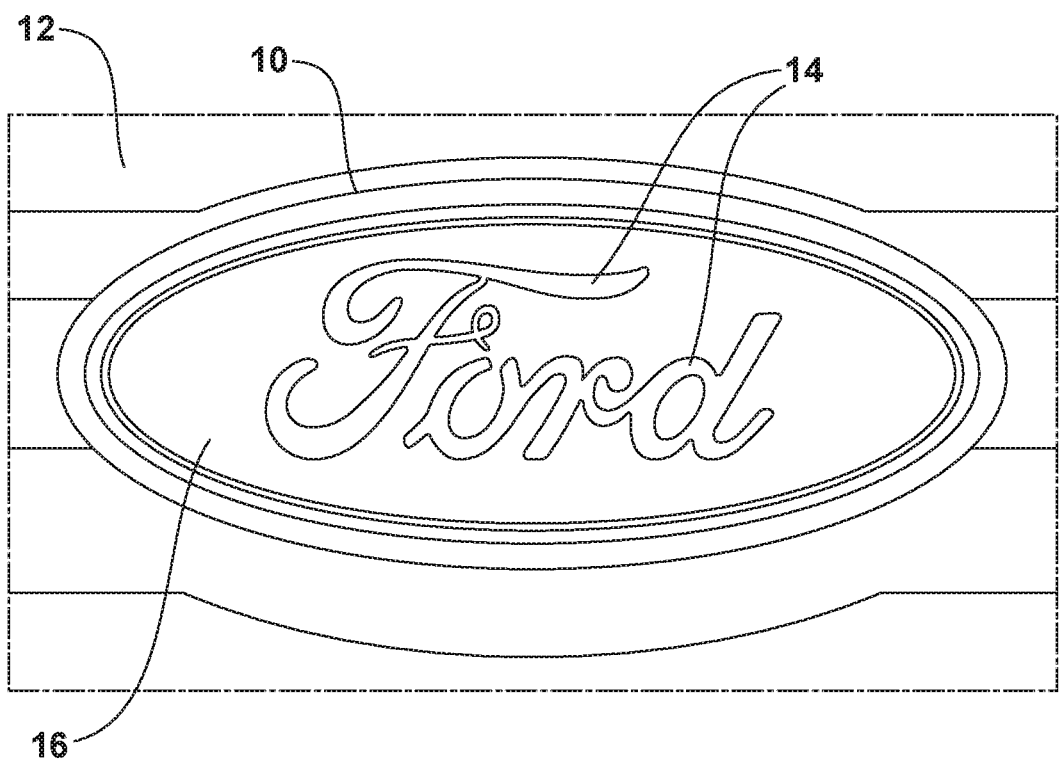
FIG. 1 is a detailed front elevational view of an illuminated badge displayed on a radiator grille of a motor vehicle.

Reference is now made to FIG. 1 illustrating an illuminated badge 10 mounted on a radiator grille 12 of a motor vehicle. As illustrated in FIG. 1, the illuminated badge 10 includes a first portion and associated light source 14 in a first color, such as silver, and a second portion and associated light source 16 in a second color, such as blue. As illustrated, the first portion 14 spells out the motor vehicle manufacturer's name "Ford" while the second portion 16 provides an oval-shaped background.

Figure 2:
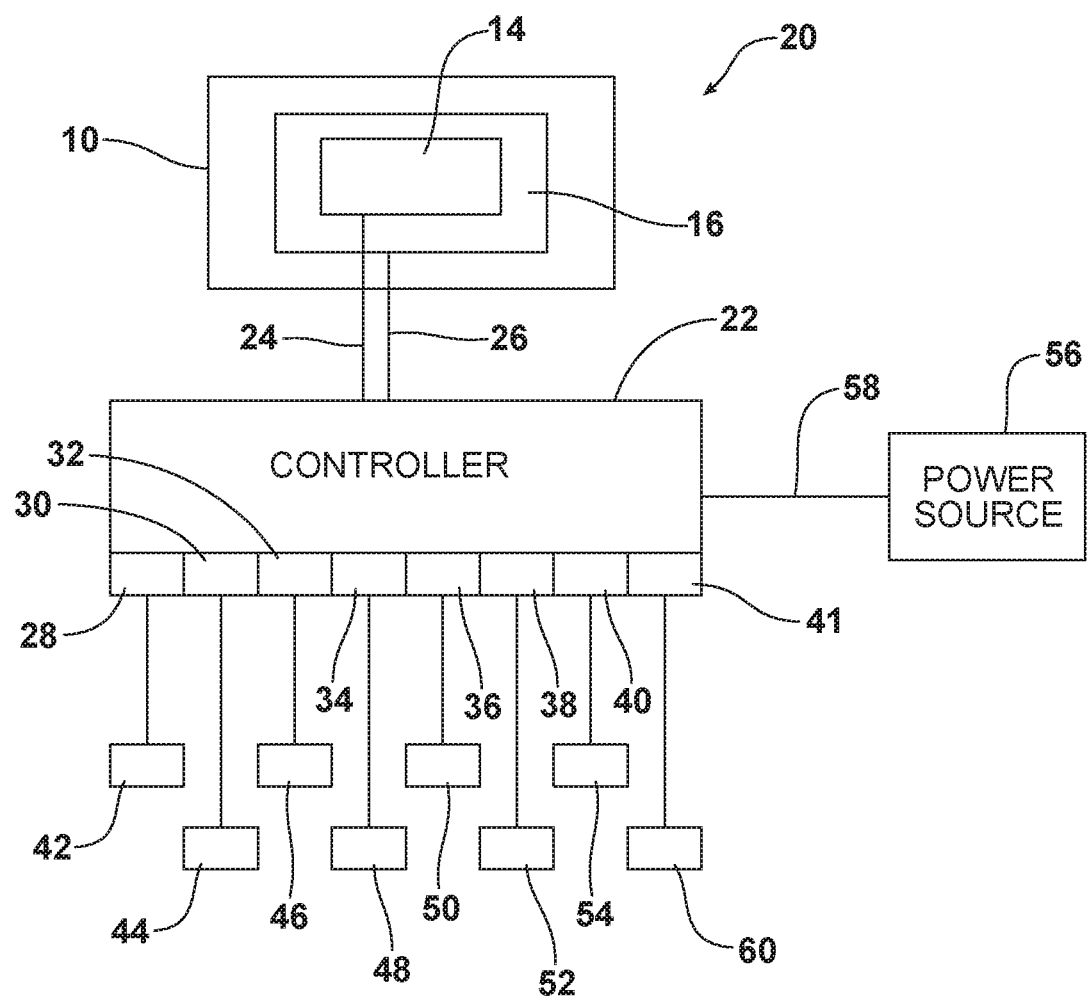
FIG. 2 is a schematic block diagram of the illuminated badge system that is the subject matter of this document.

References is now made to FIG. 2 schematically illustrating the illuminated badge system 20 that is the subject matter of this document. As illustrated, the illuminated badge system 10 includes the illuminated badge 10 with the first portion 14 illuminated in a first color and the second portion 16 illuminated in a second color. Each portion 14, 16 of the illuminated badge 10 is connected to a controller 22. Note control line 24 between the controller 22 and the first portion 14 and control line 26 between the controller 22 and the second portion 16.

The controller 22 comprises a computing device such as a dedicated microprocessor or an electronic control unit (ECU) operating on direction from appropriate control software. Thus, the controller 22 may comprise one or more processors, one or more memories and one or more network interfaces which communicate with each other over a communication bus.

As further illustrated in FIG. 2, the controller 22 may be configured with various inputs. In the illustrated embodiment, the controller 22 includes a headlight status input 28, a transmission state input 30, a key fob signal detection input 32, a motor vehicle speed input 34, an ambient light input 36, a presence sensor input 38 for determining when the motor vehicle is unattended, a battery charge state input 40 and a rain sensor input 41.

As further illustrated in FIG. 2, the headlight status input 28 is connected to a sensor, a controller, an electronic control unit or other device 42 providing data respecting the headlight status of the motor vehicle: that is, whether or not the headlights are on and whether not the headlights are on low beam or high beam.

The transmission state input 30 is connected to a sensor, a controller, an electronic control unit or other device 44 providing data respecting the transmission state of the motor vehicle: for example, whether the motor vehicle in park, reverse or a forward gear.

The key fob signal detection input 32 is connected to a sensor, a controller, an electronic control unit or other device 46 such as a body control module (BCM) capable of detecting key fob signals and determining whether the key job signal provides authorized access to the motor vehicle. The device 46 may also determine whether the detected key fob signal is one for a vehicle made by the same manufacturer as the motor vehicle in question.

The motor vehicle speed input 34 is connected to a sensor, electronic control unit or other device 48 that provides data respecting the current speed of the motor vehicle.

The ambient light input 36 is connected to a light sensor, electronic control unit or other device 50 that provides data respecting the current ambient light conditions to which the motor vehicle is subjected.

The presence sensor input 38 is connected to a presence sensor, electronic control unit or other device 52 providing data respecting the presence of an individual within the motor vehicle. Such a presence sensor 52 may, for example, comprise a digital camera, a sonar device, a radar device, an infrared camera, pressure sensors in the seats or other appropriate indicators of the presence of an individual within the motor vehicle.

The battery charge state input 40 is connected to a voltage sensor, an electronic control unit or other device 54 providing data respecting the battery charge state of the battery of the motor vehicle. A power source 56 such as a battery is connected to the controller 22 through the line 58. The battery 56 is used to power the controller 22 of the illuminated badge system 20 as well as the portions 14, 16 of the illuminated badge 10. As previously noted, each portion 14, 16 includes its own light source, such as one or more light emitting diodes or one or more light-emitting diodes and associated rylene die materials adapted to glow in a particular color when excited by light from an adjacent light source.

Finally, the rain sensor input 41 is connected to a rain sensor, an electronic control unit or other device 60 providing data respecting the current precipitation conditions to which the motor vehicle is subjected.

The controller 22 is configured to adjust the parameter of the light emitted from the illuminated badge 10 in response to various monitored parameters. Where the illuminated badge 10 includes two portions 14, 16 of different color, the controller 22 may be configured to adjust a parameter of a light emitted from both portions 14, 16 either together or independently. In one possible embodiment, the controller 22 adjusts the intensity of light emitted from either or both portions 14, 16 of the badge 10, the color of light emitted from either or both portions of the badge or both the intensity and color of light emitted from either or both portions of the badge.

Thus, for example, when the controller 22 receives data at the input 28 from the device 42 indicating that the low beam headlights are in use, the badge 10 including portions 14 and 16 may be illuminated at a first intensity. In contrast, when the controller 22 receives data from the device 42 at the input 28 indicating that the high beam headlights are in use, the controller 22 may send a signal to the illuminated badge 10 causing the first and second portions, 14, 16 to be illuminated at a second, higher intensity so as to maintain the relative brightness and visibility of the badge in the high beam headlights versus the low beam headlights.

Figure 3:
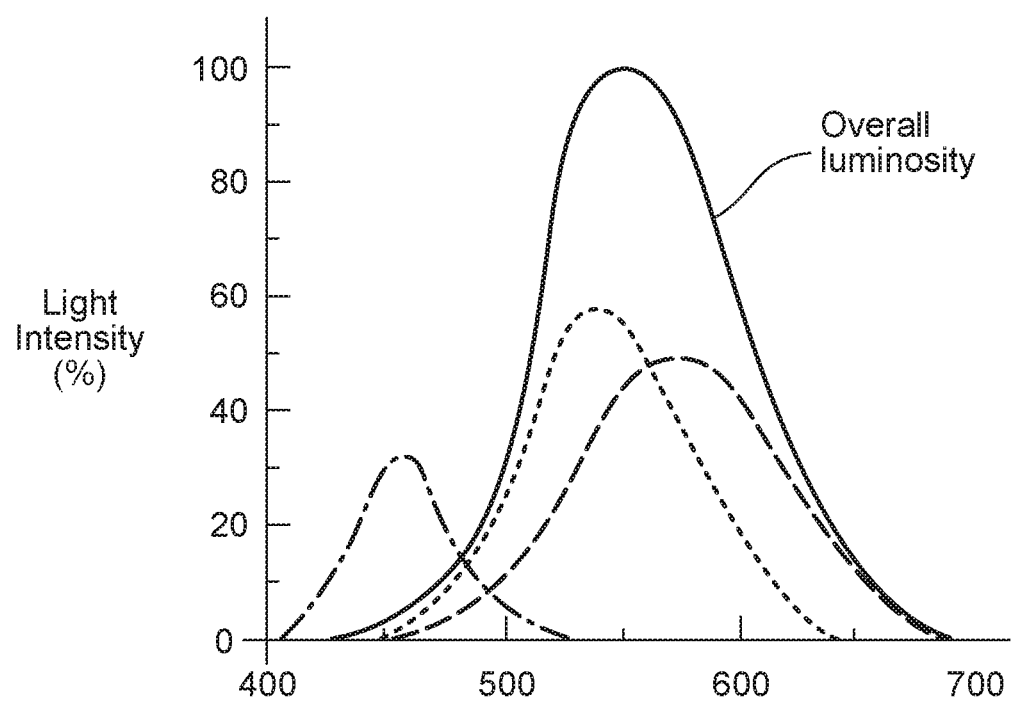
FIG. 3 is a graph depicting the overall luminosity of blue, green, red and white light.

When the controller 22 receives data through the input 30 from the device 44 indicating that the motor vehicle transmission is in park, the second portion 16 of the badge 10 that is blue in color may be illuminated by the controller at a high intensity while the first portion 14 that is silver in color may be illuminated at a lower intensity. Thus, it should be appreciated that the controller 22 illuminates the badge 10 in response to the sensitivity of the human eye to different colors as indicated, for example, graphically in FIG. 3 which illustrates the overall luminosity of blue, green, red and white light.

In contrast, when the input 30 receives data from the device 44 indicating the transmission state of the motor vehicle is in a forward or reverse gear, the controller 22 will increase the intensity of the light from the first or silver/chrome portion 14 of the badge while decreasing the intensity of or extinguishing the light emitted by the second or blue portion 16 of the batch. Thus, the first portion or manufacturer name 14 is clearly visible when the vehicle is in operation and the intensity of the light emitted by the first portion is increased to ensure that visibility even when high beam headlights are in use as previously described.

The controller 22 may also be configured to respond to the speed of the motor vehicle. Thus, for example, when the controller 22 receives data to the input 34 from the device 48 indicating an increase in the speed of the motor vehicle, the controller 22 may increase the intensity of the light emitted from either or both portions 14, 16 of the illuminated badge 10. In contrast, as the motor vehicle slows, the controller may reduce the intensity of the light emitted from either portion 14, 16 of the badge 10. The controller 22 may also be configured not to exceed a maximum intensity level.

The controller 22 may also be configured to be responsive to ambient light conditions. Thus, when the input 36 receives data from the device 50 indicating an increase in ambient light, the controller may increase the intensity of light emitted from either or both portions 14, 16 of the badge 10. In contrast, in lower ambient light conditions, the controller 22 may reduce the intensity of the light emitted from either portion 14, 16 of the badge 10. The purpose of this is to create a low key and unique appearance in substantially low ambient light conditions. Similarly, it should be appreciated that the controller 22 may adjust the intensity or color of the light emitted by either portion 14, 16 of the badge 10 in rainy conditions as indicated by data received at the rain sensor input 41 from the rain sensor 60. Further, the controller 22 may be configured so that during daytime driving, rain sensor driven intensity will override headlight intensity. In contrast, a controller could be configured so that headlight intensity overrides rain sensor driven intensity.

The controller 22 may also be provided with an unattended mode of operation. Thus, for example, in low ambient light conditions (confirmed at the input 36) when the vehicle is not running and is in an unoccupied state (confirmed by the presence sensor input 38 and data received from the device 52), the controller may continue to illuminate the badge at a low intensity for a predetermined period of time, such as 24 hours, or, for example, until the battery charge state input 40 receives data input from the device 54 indicating that the battery charge state has reached 50% or some other predetermined level. When the predetermined charge state is reached, the controller then extinguishes the illuminated badge 10. The controller 22 may also be configured to recognize a signal from a key fob of the manufacturer of the motor vehicle that is not matched to the motor vehicle. Thus, when the controller 22 receives an indication of a same manufacturer, nonmatching key fob signal from the device 46 at the key fob signal detection input 32, the controller 22 may direct either or both portions 14, 16 of the illuminated badge 10 to go to high intensity for a predetermined period of time such as 0.2 seconds, so that the badge blinks as a sign of manufacturer recognition and loyalty.

From the above, it should be appreciated that the illuminated badge system 20 may be utilized in a method of controlling a parameter of light emitted from an illuminated badge 10 of a motor vehicle. That method may be broadly described as comprising the step of adjusting, by means of the controller 22, the parameter in response to headlights status of the motor vehicle and/or the transmission status of the motor vehicle and/or the motor vehicle speed and/or ambient light conditions. The controller 22 may also adjust the parameter of light emitted from the illuminated badge based upon the motor vehicle being unattended. Further, the controller 22 may adjust the parameter of light emitted from the badge 10 in response to detection of a signal from a key fob that is not matched to the motor vehicle. Still further, the controller 22 may adjust the parameter of light emitted from the badge 10 in response to detection of a signal indicative of current rain or precipitation conditions.

In the illustrated embodiment, the illuminated badge system 20 may include a badge 10 with portions 14, 16 of different colors. The method may also include adjusting, by means of the controller 22, the intensity of light emitted from the first and second portions 14, 16 of the illuminated badge 10 in response to the sensitivity of the human to the colors of the first and second portions.

The foregoing has been presented for purposes of illustration and description. It is not intended to be exhaustive or to limit the embodiments to the precise form disclosed. Obvious modifications and variations are possible in light of the above teachings. For example, the illuminated badge 10 in the illustrated embodiment includes two portions 14, 16 in two different colors, but it should be appreciated that the badge may include only one portion in multiple colors or more than two portions in different colors. Further, the badge may be totally of a single color. All such modifications and variations are within the scope of the appended claims when interpreted in accordance with the breadth to which they are fairly, legally and equitably entitled.

What is claimed:

1. An illuminated badge system for a vehicle, comprising:
   an illuminated badge, wherein a first portion is configured as an indicium and a second portion is configured as a border;
   a rain sensor operably coupled to said illuminated badge; and
   a controller configured to include an unattended mode for illuminating said illuminated badge at a first intensity when said vehicle is unattended and at a second intensity when the vehicle is attended wherein the first intensity is less than the second intensity, and wherein a parameter of light emitted from said illuminated badge is adjusted by said controller in response to an input received from said rain sensor,
   wherein said controller is configured to adjust said first portion to be illuminated in a first color at a third intensity and said second portion to be illuminated in a second color at a fourth intensity in response to a transmission state, wherein said third intensity is higher than said fourth intensity when said vehicle is in at least one of forward and reverse gears, and wherein said fourth intensity is higher than said second intensity when said vehicle is in park.

2. The illuminated badge system of claim 1, wherein said controller is further configured to adjust a parameter of light emitted from said illuminated badge in response to transmission state of said vehicle.

3. The illuminated badge system of claim 2, wherein said adjusted parameter is light intensity.

4. The illuminated badge system of claim 2, wherein said adjusted parameter is light color.

5. The illuminated badge system of claim 1, wherein said illuminated badge has a first portion illuminated in a first color and a second portion illuminated in a second color.

6. The illuminated badge system of claim 1, wherein said controller is further configured to adjust a parameter of light emitted from said illuminated badge in response to vehicle speed.

7. The illuminated badge system of claim 1, wherein said controller is further configured to adjust a parameter of light emitted from said illuminated badge in response to ambient light conditions, or ambient light and rain conditions.

8. The illuminated badge system of claim 1, wherein said controller is further configured to monitor a battery charge state of said vehicle and extinguish said illuminated badge when said battery charge state has fallen to a predetermined level.

9. An illuminated badge system for a vehicle, comprising:
   an illuminated badge having a first portion illuminated in a first color and a second portion illuminated in a second color, wherein said first portion is configured as an indicium and said second portion is configured as a border; and
   a controller configured to adjust a parameter of light emitted from said illuminated badge in response to a transmission state of said vehicle, wherein said controller is configured to adjust said first portion to be illuminated in a first color at a first intensity and said second portion to be illuminated in a second color at a second intensity in response to said transmission state, wherein said first intensity is higher than said second intensity when said vehicle is in at least one of forward and reverse gears, and wherein said second intensity is higher than said first intensity when said vehicle is in park.

10. The illuminated badge system of claim 9, wherein said adjusted parameter is light intensity.

11. The illuminated badge system of claim 9, wherein said adjusted parameter is light color.

12. The illuminated badge system of claim 9, wherein said controller is further configured to adjust a parameter of light emitted from said illuminated badge in response to vehicle speed.

13. The illuminated badge system of claim 9, wherein said controller is further configured to adjust a parameter of light emitted from said illuminated badge in response to ambient light conditions, rain conditions or ambient light and rain conditions.

14. The illuminated badge system of claim 9, wherein said controller is further configured to monitor a battery charge state of said vehicle and extinguish said illuminated badge when said battery charge state has fallen to a predetermined level.

15. An illuminated badge system for a vehicle, comprising:
an illuminated badge having a first portion illuminated in a first color and a second portion illuminated in a second color, wherein said first portion is configured as an indicium and said second portion is configured as a border;
a rain sensor disposed on said illuminated badge; and
a controller configured to adjust a parameter of light emitted from said illuminated badge in response to a headlight status of said vehicle, wherein light intensity of said light is adjusted in response to data received from said rain sensor, wherein said controller is configured to adjust said first portion to be illuminated in a first color at a first intensity and said second portion to be illuminated in a second color at a second intensity in response to a transmission state, wherein said first intensity is higher than said second intensity when said vehicle is in at least one of forward and reverse gears, and wherein said second intensity is higher than said first intensity when said vehicle is in park.

16. The illuminated badge system of claim 15, wherein said controller is further configured to adjust a parameter of light emitted from said illuminated badge in response to transmission state of the vehicle.

17. The illuminated badge system of claim 15, wherein said adjusted parameter is light intensity.

18. The illuminated badge system of claim 15, wherein said adjusted parameter is light color.

19. The illuminated badge system of claim 15, wherein said controller is further configured to adjust a parameter of light emitted from said illuminated badge in response to vehicle speed.

20. The illuminated badge system of claim 15, wherein said controller is further configured to adjust a parameter of light emitted from said illuminated badge in response to ambient light conditions, or ambient light and rain conditions.

* * * * *